United States Patent
Buehler et al.

(10) Patent No.: US 9,522,744 B2
(45) Date of Patent: Dec. 20, 2016

(54) METHOD FOR MANAGEMENT OF A MAINTENANCE ROUTINE FOR AN AIRCRAFT AND A MAINTENANCE SYSTEM

(71) Applicant: GE Aviation Systems LLC, Grand Rapids, MI (US)

(72) Inventors: Eric Daniel Buehler, Grand Rapids, MI (US); Sally Mae Ward, Jenison, MI (US); Brion Lee Frost, Grand Rapids, MI (US); Allan Anderson McCurdy, III, Grandville, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 14/478,098

(22) Filed: Sep. 5, 2014

(65) Prior Publication Data
US 2016/0068279 A1    Mar. 10, 2016

(51) Int. Cl.
*B64F 5/00* (2006.01)
*G07C 5/08* (2006.01)
*G07C 5/00* (2006.01)

(52) U.S. Cl.
CPC .......... *B64F 5/0045* (2013.01); *G07C 5/0808* (2013.01); *G07C 5/0841* (2013.01); *G07C 5/006* (2013.01)

(58) Field of Classification Search
CPC ........ B64F 5/00; B64F 5/0045; G07C 5/0808; G07C 5/0841
USPC .................. 701/3, 14, 29.4, 33.2, 34.2, 34.4
See application file for complete search history.

(56) References Cited

U.S. PATENT DOCUMENTS

| | | | |
|---|---|---|---|
| 5,111,402 A | 5/1992 | Brooks et al. | |
| 6,150,959 A * | 11/2000 | Germanetti | G01C 23/00 340/945 |
| 6,418,361 B2 * | 7/2002 | Sinex | G06Q 10/025 340/439 |
| 6,768,935 B1 * | 7/2004 | Morgan | G06Q 10/10 701/29.6 |
| 7,440,906 B1 * | 10/2008 | Wetzer | G06Q 10/0631 705/7.12 |
| 8,607,188 B2 | 12/2013 | Gifford et al. | |
| 8,620,714 B2 * | 12/2013 | Williams | G06Q 10/0637 701/29.3 |
| 9,043,938 B1 * | 5/2015 | Raghu | H04W 12/06 713/183 |
| 2004/0199307 A1 * | 10/2004 | Kipersztok | B64F 5/0045 701/32.9 |
| 2005/0105527 A1 * | 5/2005 | Vervust | H04L 12/189 370/390 |
| 2005/0165524 A1 * | 7/2005 | Andrushenko | G06Q 10/06 701/29.6 |

(Continued)

OTHER PUBLICATIONS

GB Combined Search and Exam Report issued on Feb. 24, 2016 in connection with corresponding GB Application 1515481.8.

*Primary Examiner* — Tyler J Lee
(74) *Attorney, Agent, or Firm* — GE Global Patent Operation; William S. Munnerlyn

(57) ABSTRACT

A maintenance system for use with an aircraft and a method for management of a maintenance routine for an aircraft with a maintenance system comprising multiple communication terminals located physically about the aircraft and in data communication with each other, the method includes executing a maintenance software program for a maintenance routine comprising maintenance tests corresponding to components of the aircraft.

10 Claims, 4 Drawing Sheets

(56) References Cited

U.S. PATENT DOCUMENTS

| | | | |
|---|---|---|---|
| 2010/0152954 A1* | 6/2010 | Ric | G06F 11/2294 |
| | | | 701/31.4 |
| 2010/0195634 A1* | 8/2010 | Thompson | H04W 36/385 |
| | | | 370/338 |
| 2010/0256865 A1 | 10/2010 | Ying | |
| 2011/0040595 A1 | 2/2011 | Chou et al. | |
| 2013/0066487 A1* | 3/2013 | Holder | G08G 5/0021 |
| | | | 701/14 |
| 2013/0346572 A1 | 12/2013 | Jain et al. | |
| 2015/0066250 A1* | 3/2015 | Garzella | B64D 43/00 |
| | | | 701/3 |
| 2015/0066342 A1* | 3/2015 | Garzella | G06Q 10/06311 |
| | | | 701/120 |
| 2015/0232065 A1* | 8/2015 | Ricci | B60R 25/01 |
| | | | 701/36 |

* cited by examiner

METHOD FOR MANAGEMENT OF A MAINTENANCE ROUTINE FOR AN AIRCRAFT AND A MAINTENANCE SYSTEM

BACKGROUND OF THE INVENTION

Contemporary aircraft may include a variety of systems and components that require maintenance. Aircraft maintenance may include, among other things, general upkeep, overhaul, repair, and/or inspection of an aircraft, aircraft system(s), and/or aircraft component(s).

BRIEF DESCRIPTION OF THE INVENTION

In one embodiment, the invention relates to a method for management of a maintenance routine for an aircraft with a maintenance system comprising multiple communication terminals located physically about the aircraft and in data communication with each other, the method comprising executing, by the maintenance system, a maintenance software program for the maintenance routine comprising maintenance tests corresponding to components of the aircraft, defining, by the maintenance system, an ultimate user, and assigning a maintenance test to a communications terminal associated with a corresponding component to define an associated terminal for controlling the execution of the maintenance test by displaying a maintenance test indication on the associated terminal wherein the ultimate user may override the assignment of the maintenance test or may end the maintenance routine before completion of the maintenance test.

In another embodiment, the invention relates to a maintenance system for use with an aircraft, the maintenance system includes multiple communication terminals located physically about the aircraft and in data communication with each other and at least one controller configured to execute a maintenance software program for the maintenance routine comprising maintenance tests corresponding to components of the aircraft, define an ultimate user, and assign a maintenance test to a communications terminal associated with a corresponding component to define an associated terminal for controlling the execution of the maintenance test by displaying a maintenance test indication on the associated terminal and where the ultimate user may override the assignment of the maintenance test or may end the maintenance routine before completion of the maintenance test.

DESCRIPTION OF EMBODIMENTS OF THE INVENTION

Figure 1:
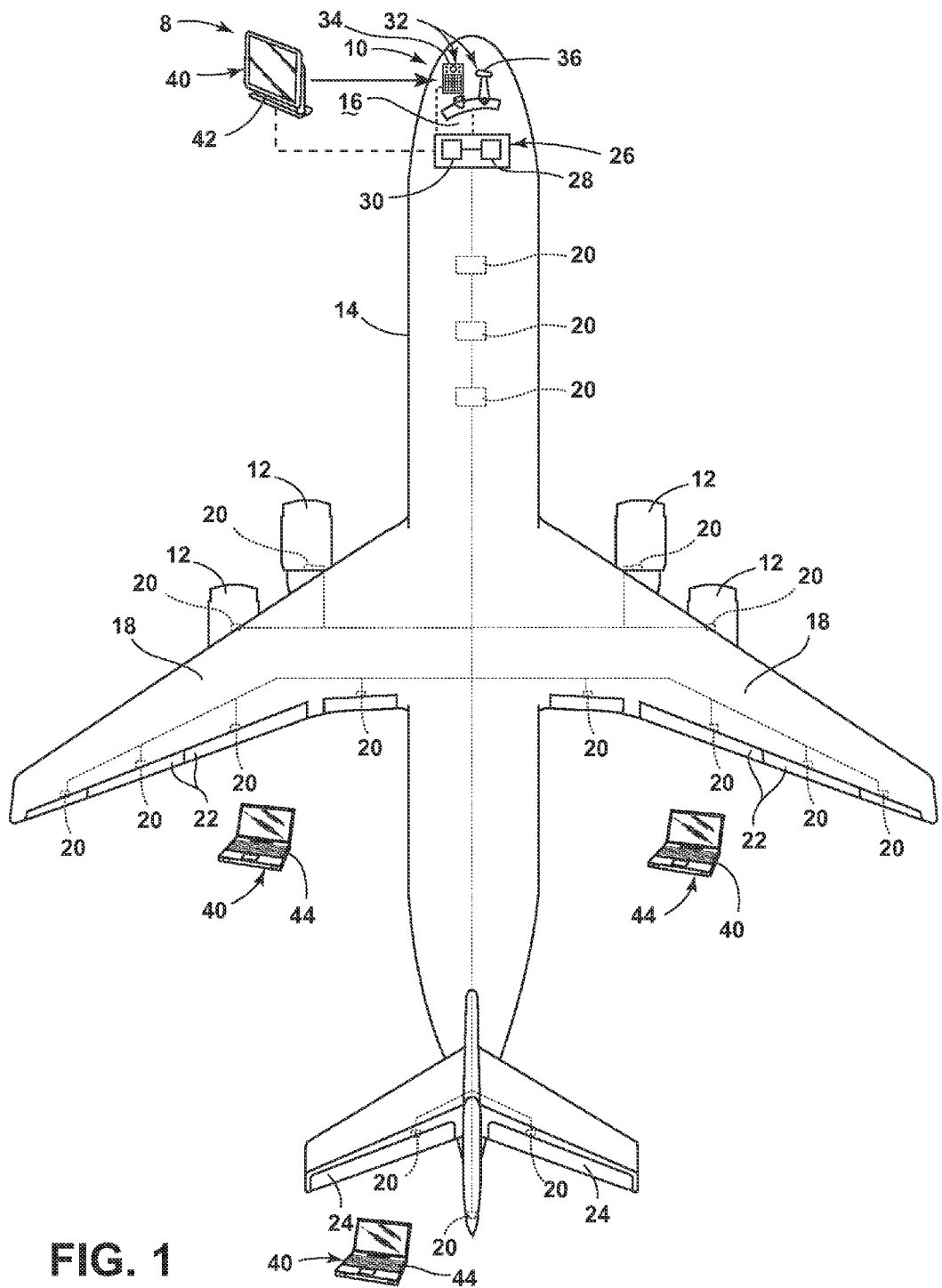
FIG. 1 is a schematic view of a maintenance system for use with an aircraft according to an embodiment of the invention.

FIG. 1 illustrates a maintenance system 8 for use with an aircraft 10, where the maintenance system 8 may be used to facilitate a maintainer's job with identifying, troubleshooting, and resolving system and component issues. The exemplary aircraft 10 may execute portions of embodiments of the invention and may include one or more engine assemblies 12 coupled to a fuselage 14, a cockpit 16 positioned in the fuselage 14, and wing assemblies 18 extending outward from the fuselage 14. While a commercial aircraft has been illustrated, it is contemplated that embodiments of the invention may be used in any type of aircraft, for example, without limitation, fixed-wing, rotating-wing, rocket, personal aircraft, and military aircraft.

A plurality of aircraft components and systems 20 that enable proper operation of the aircraft 10 may be included in the aircraft 10. By way of non-limiting example and for use in a working example below, flaps 22 and elevators 24 have been called out with alternative numerals. One or more computers or controllers 26, which may be operably coupled to the plurality of aircraft components and systems 20, including the flaps 22 and elevators 24, to control their operation. While only a single controller 26 has been illustrated, it is contemplated that any number of controllers 26 may be included in the aircraft 10. In such an instance, the controller 26 may also be connected with other controllers of the aircraft 10. The controller 26 may include or be associated with any suitable number of individual microprocessors, power supplies, storage devices, interface cards, auto flight systems, flight management computers, and other standard components. For example, the controller 26 may include memory 28, the memory 28 may include random access memory (RAM), read-only memory (ROM), flash memory, or one or more different types of portable electronic memory, such as discs, DVDs, CD-ROMs, etc., or any suitable combination of these types of memory. The controller 26 may also include one or more processors 30, which may be running any suitable program. The controller 26 may include or cooperate with any number of software programs or instructions designed to carry out the various methods, process tasks, calculations, and control/display functions necessary for operation of the aircraft 10. The controller 26 is illustrated as being in communication with the plurality of aircraft components and systems 20 and it is contemplated that the controller 26 may aid in operating the aircraft components and systems 20 and may receive information from the aircraft components and systems 20. The controller 26 may be a portion of a flight management system or may be operably coupled to the flight management system.

A variety of control mechanisms 32 may be included in the cockpit 16 for actuation or operating various components 20 of the aircraft 10. The control mechanisms 32 may be any suitable mechanisms including a keyboard and cursor controller 34. By way of further non-limiting example, one control mechanism 32 may include a flap handle 36, which may be operated by a pilot to set the position of the multiple flaps 22. The term flap handle as used in this description is not limited to a physical handle, rather it relates to the control device used to set the position of the flaps. Throughout the early part of aviation, this control device was a handle and the term flap handle has now become generic to the control device used to set the flap position, regardless of whether the control device is an actual handle or a button on a touch-screen user interface.

Further, the maintenance system 8 has been illustrated as having a variety of exemplary multiple communication terminals 40 located physically about the aircraft 10. It will be understood that about the aircraft 10 may include internal of the aircraft 10 and/or external of the aircraft 10. For example, one of the multiple communication terminals 40 has been illustrated as a flight display 42 that may be located in the cockpit 16. The flight displays 42 may include either a primary flight display or multi-function display and may display a wide range of aircraft, flight, navigation, maintenance and other information used in the operation, control, and maintenance of the aircraft 10. The flight display 42 may be capable of displaying color graphics and text to a user. The flight display may be operably coupled with any number of control mechanisms 32 to allow a user to interact with information on the flight display. While only a single flight display 42 within the aircraft 10 has been illustrated as being included in the maintenance system 8 it is contemplated that any number of the multiple communications terminals 40 may be located within any suitable portion of the aircraft 10.

One or more of the multiple communication terminals 40 may be external communication terminals 44. While such external communication terminals 44 have been illustrated as laptop computers, it will be understood that the external communication terminals 44 may be any suitable device(s) and such device(s) may be fixed and/or moveable.

Regardless of what type of multiple communication terminals 40 are included and where they are located about the aircraft, the multiple communication terminals 40 may be in data communication with each other and each may provide access to a maintenance routine such that the maintenance routine may be completed by at least one user via at least one of the multiple communication terminals 40 and where the multiple communication terminals 40 are configured to support a number of independent, non-interactive maintenance tests. The communication terminals 40 may be configured to accept user inputs. It is contemplated that the multiple communication terminals 40 may be wired or wirelessly coupled through any variety of communication mechanisms. For example, the multiple communication terminals 40 may be capable of wirelessly linking with other systems and devices through packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. It will also be understood that the particular type or mode of wired or wireless communication is not critical to embodiments of the invention, and later-developed wireless networks are certainly contemplated as within the scope of embodiments of the invention. Further, any type of hard-wired transfer such as Ethernet may communicably couple the multiple communication terminals 40.

Further, at least one controller may be included in the maintenance system 8 and may be coupled with one or more of the multiple communication terminals 40. It is contemplated that the at least one controller may be the controller 26 of the aircraft 10, a controller located within an external communication terminal 44, or an additional controller located either at the location of the aircraft 10 or remote from the aircraft 10. Further, multiple controllers may be utilized. The at least one controller may be any suitable processor, general or specific designed for the task. For the remainder of the specification the at least one controller will be described as the controller 26 for ease of explanation.

The controller 26 may be configured to execute a maintenance software program for a maintenance routine comprising maintenance tests corresponding to components 20 of the aircraft, including systems of the aircraft 10. The controller 26 may be configured to display the maintenance routine on at least one of the multiple communication terminals 40 to define a control terminal, assign maintenance tests to a communications terminal 40 associated with the corresponding component 20 to define an associated terminal for controlling the execution of the maintenance test by displaying a maintenance test indication on the associated terminal and upon completion of the maintenance tests, displaying a maintenance routine completion on the control terminal. Furthermore, the controller 26 may be configured to allow multiple users to access the maintenance tests and the controller 26 may be configured to assign the maintenance tests between the multiple communication terminals.

Furthermore, the controller 26 may be configured to determine which of the multiple communications terminals 40 should be defined as the control terminal. The controller 26 may also be configured to determine, which communications terminal 40 should be defined as an associated terminal for each of the various maintenance tests.

The controller 26 may be configured to conduct any suitable functions to aid in executing the maintenance routine including that the controller 26 may support a number of simultaneous, independent, non-interactive sessions as specified in session security configuration information, including up to a predetermined maximum. The controller 26 may transfer control of a session from one location to another. The controller 26 may support display of one interactive user session on one or more flight deck displays. The controller 26 may check for an available session upon receiving a session connection request from a communication terminal. The controller 26 may send an indication of session establishment to the requesting communication terminal when an appropriate session is available or send an indication of session denial when an appropriate session is not available. The controller 26 may make a session available for future use when the communication terminal using that session disconnects. The controller 26 may invalidate an existing session with no background tasks upon receiving a logout request or return an error when any background tasks are running upon receiving a logout request. The controller 26 may return session information for all active sessions upon receiving a session's information request with no username parameter provided. The controller 26 may invalidate all sessions specified in the request parameters and abort any background tasks for those sessions upon receiving a session's logout request. The controller 26 may invalidate all sessions specified in the request parameters upon receiving a sessions logout request when none of the sessions specified have background tasks running. The controller 26 may return session information for all active sessions where the session's username matches the username provided upon receiving a session's information request with a 'username' request parameter. The controller 26 may return session function permissions for all requested sessions upon receiving a session's function request. The controller 26 may reset a re-authentication timer for a session upon receiving a keep-alive request. The controller 26 may update a location string of a session upon receiving a location request, return session information for the current session upon receiving a session request, return function permissions for the current session upon receiving a function list request, return session process information for the current session upon receiving a process list request, return system state information upon receiving a system state request, return header information for the current session upon receiving a header information request, return member system information upon receiving an aircraft member system list request, return session configuration information for the current session upon receiving a session configuration request, etc.

The controller 26 may include all or a portion of a computer program having an executable instruction set for executing the maintenance software program, displaying the maintenance routine, assigning the maintenance tests, etc. The program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc., that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general-purpose computer, special purpose computer, or special purpose processing machine to perform a certain function or group of functions.

The controller 26 may also be configured to execute a maintenance software program for the maintenance routine comprising maintenance tests corresponding to components of the aircraft, define an ultimate user, and assign a maintenance test to a communications terminal associated with a corresponding component to define an associated terminal for controlling the execution of the maintenance test by displaying a maintenance test indication on the associated terminal and where the ultimate user may override the assignment of the maintenance test or may end the maintenance routine before completion of the maintenance test. The controller 26 may be configured to allow multiple users to access the maintenance routine at one or more communication terminals. The ultimate user may be defined by the controller based on a user input, based on an identification or determination of the user, based on a predetermined privilege associated with the user and/or based on the control terminal being used.

It will be understood that the aircraft 10 and the multiple communication terminals 40 merely represent exemplary embodiments that may be configured to implement embodiments or portions of embodiments of the invention. During operation, the controller 26 may execute a maintenance software program to allow a maintenance routine to be completed. One or more maintenance personnel may interact with the controller 26 via any of the multiple communication terminals 40 to execute portions of the maintenance tests including that the maintenance test may be assigned to the multiple communication terminals 40. It will be understood that details of environments that may implement embodiments of the invention are set forth in order to provide a thorough understanding of the technology described herein. It will be evident to one skilled in the art, however, that the exemplary embodiments may be practiced without these specific details and in alternative manners. The exemplary embodiments are described with reference to the drawings. These drawings illustrate certain details of specific embodiments that implement a module or method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media may be any available media, which may be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that may be used to carry or store desired program code in the form of machine-executable instructions or data structures and that may be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general-purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc., that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices. The above representation is merely for context and it will be understood that the maintenance system 8 may include any suitable additional components and be utilized in any suitable manner.

Figure 2:
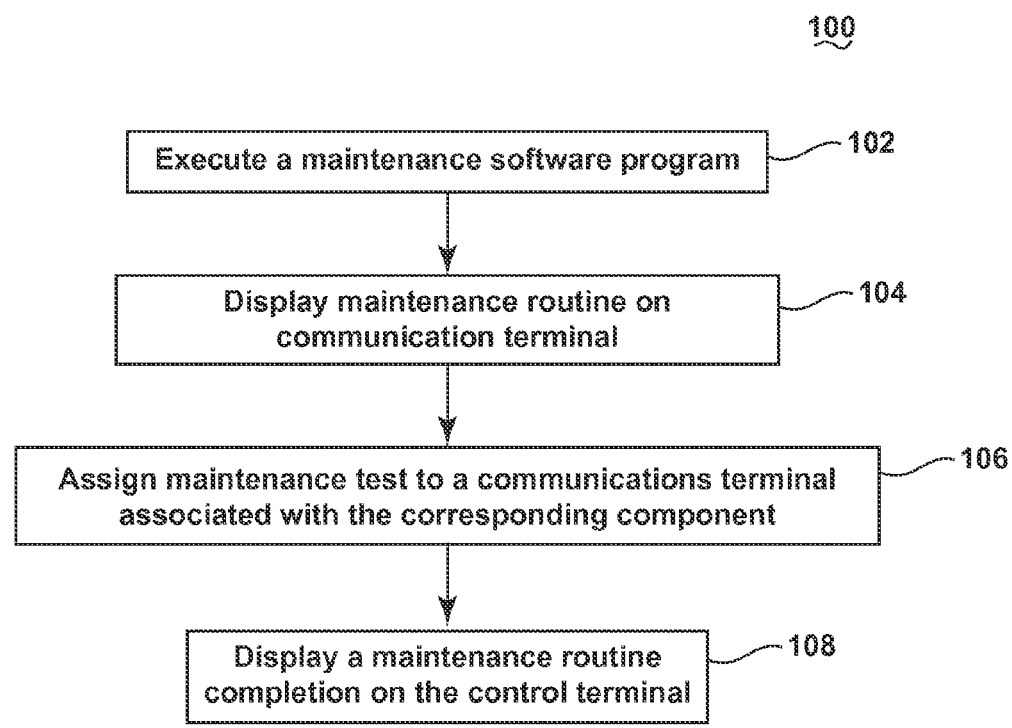
FIG. 2 is a flowchart showing a method of implementing a maintenance schedule for an aircraft according to an embodiment of the invention.

In accordance with an embodiment of the invention, FIG. 2 illustrates a method 100, which may be used for implementing a maintenance schedule for an aircraft, such as the aircraft 10, with a maintenance system comprising multiple communication terminals located physically about the aircraft and in data communication with each other, such as the maintenance system 8. The method 100 begins at 102 with the maintenance system 8 executing a maintenance software program for a maintenance routine comprising maintenance tests corresponding to components 20 of the aircraft 10. It will be understood that the components 20 may include individual parts of the aircraft 10 and/or systems of the aircraft 10.

At 104, the maintenance system 8 may display the maintenance routine on at least one of the multiple communication terminals 40 to define a control terminal. In this manner, the maintenance software program may be executed on a computer in communication with the control terminal and/or one of the other multiple communication terminals 40. By way of non-limiting example, the control terminal may be automatically designated as a specific one of the multiple communication terminals 40. Alternatively, the maintenance system 8 may determine which of the multiple communication terminals 40 should be designated as the control terminal. For example, the control terminal may be determined based on where the communication terminal 40 is located or what user is accessing the communication terminal 40. By way of non-limiting example, the controller 26 may have access to maintenance personnel information including hierarchical information for the maintenance personnel.

During the maintenance routine, the maintenance system 8 may assign a maintenance test to a communications terminal 40 that is associated with the corresponding component 20 of the aircraft 10 to define an associated terminal for controlling the execution of the maintenance test, as indicated at 106. For example, by displaying a maintenance test indication on the associated terminal. Assigning the maintenance test may include assigning multiple maintenance tests utilized in the maintenance routine. This may include sequentially assigning each of the maintenance tests such that the maintenance system waits until each is done before the next is assigned. It is contemplated that assigning the maintenance tests by the maintenance system 8 may ensure that only a single communication terminal 40 may control the maintenance routine at any time. This may include limiting access to the maintenance tasks to the communication terminal 40 that is the control terminal. Alternatively, the maintenance system 8 may allow multiple communication terminals 40 to access the maintenance tasks while still only allowing the control terminal to control the maintenance routing at any time. It is also contemplated that the maintenance system may be configured to identifying a user at one or more of the multiple communication terminals. It is contemplated that some users may not have the credentials to complete the maintenance test. In such an instance, it is contemplated that the assigning may only occur when the identified user at the one of the multiple communication terminals 40 satisfies a predetermined privilege requirement. The assigning may include assigning maintenance tests to multiple users at either one or differing communication terminals 40. Further, the assigning may include either assigning maintenance tests to a single user utilizing a single communication terminal 40 or using multiple different communication terminals 40. It also contemplated that the assignment may occur automatically when the communication terminal 40, where a current maintenance task is active, disconnects. If there is no need for the tasks in the maintenance routine to be run sequentially it is contemplated that access to the maintenance system 8 including the maintenance routine may be provided to multiple operators at multiple separate locations at any one time. In implementation, the determinations made may be converted to an algorithm to implement a maintenance schedule or routine. Such an algorithm may be converted to a computer program comprising a set of executable instructions, which may be executed by the controller 26 and/or the multiple communication terminals 40.

At 108, upon completion of the maintenance tests, a maintenance routine completion indication may be displayed on the control terminal. It will be understood that the control terminal may be a set location or a location where a specific user is located. It is also contemplated that such a completion indication may be displayed on any number of the other communications terminals 40. While it is contemplated that the indication may be a single indication for the entire maintenance routine, a completion indication may also be provided after each maintenance task within the maintenance routine is finished. Such indications may be provided in any suitable manner.

Figure 3:
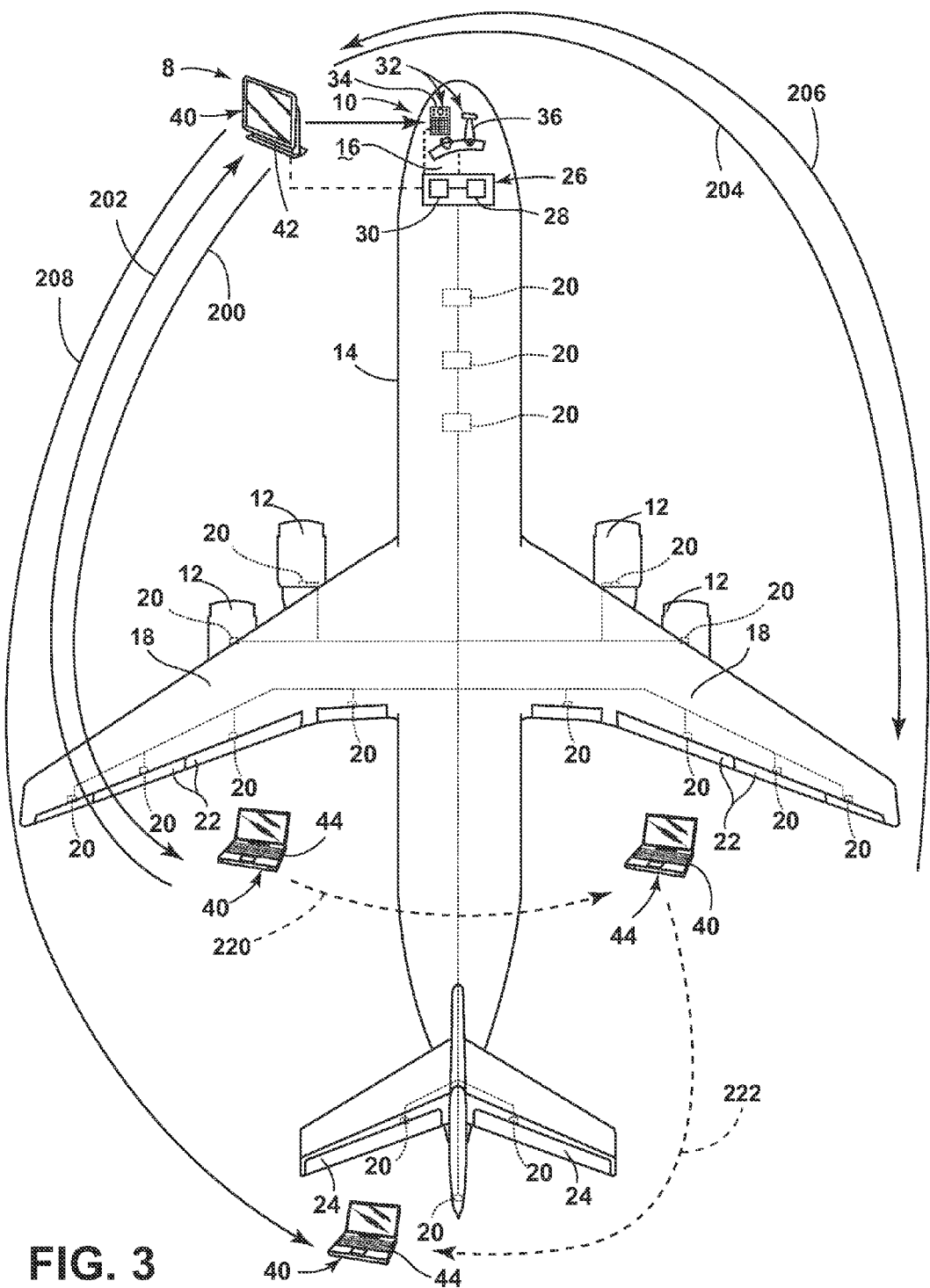
FIG. 3 is a schematic view of the maintenance system and aircraft of FIG. 1 illustrating how tasks may be assigned according to an embodiment of the invention.

An example will likely prove useful for a fuller understanding. Referring now to FIG. 3, the maintenance system 8 and aircraft 10 are again utilized for explanatory purposes and do not limit the embodiments of the invention. In the example, it is contemplated that a first user is in the cockpit 16 utilizing the flight display 42 and a second user is outside the aircraft 10 using one of the external communication terminals 44. It will be understood that while the applications uses the terms user and maintenance personnel such terms are not meant to be limiting. For example, a pilot, co-pilot, etc., may also be considered maintenance personnel as they may complete tasks within the maintenance routine.

In the illustrated example, the first user in the cockpit 16 as part of the maintenance routine may need to run the following maintenance tests: flap checkout and port side elevator alignment. The first maintenance test is the flap checkout and the first user within the cockpit 16 may select the flap check test display using the flight display 42 and may select port flap check. At some point in the test, the test indication on the flight display 42 prompts the first user to inspect the flap state at the flap location. While the first user could certainly leave the cockpit 16 to inspect the flap state, it may be more efficient to assign the task to a user external of the aircraft 10. With this in mind, the first user in the cockpit 16 may select the active session of the second user to hand off test control to as illustrated by arrow 200.

The second user may receive control of the assigned maintenance task for the port flap check test because the first user has assigned it. It is contemplated that first user may be an ultimate user that may move to another permissible test or monitor the second user's progress during the test in progress. Alternately, the maintenance system 8 may automatically assign the maintenance task based on the identity of the second user or based on the location of the external communication terminal 44. The second user continues the test in progress and may coordinate with the first user as needed. Upon completion of the port flap check test, the second user or the controller of the maintenance system 8 may assign the routine back to the first user in the cockpit 16, as indicated at 202. The user in the cockpit 16 may take control from the second user or the maintenance system 8 may determine that the second user's test is complete and may hand back control to the first user automatically.

The first user may continue with the flap checkout and select the starboard flap check. While the first user is selecting the test, the second user may move to the next location to support the starboard flap test as illustrated at 220. Alternatively, the second user may move to an alternative external communication terminal 44 associated with the starboard flap. At some point in the test, the test display prompts the first user to inspect flap state and flap location. At this point, the first user may assign the maintenance test to the second user or the maintenance system 8 may automatically assign the test as indicated at 204.

The second user receives the assigned test and continues to execute the test including coordinating with the first user as needed. Upon completion of the test, the second user may assign the task back to the first user in the cockpit, as indicated at 206. Again, the maintenance system 8 may do this automatically. For example, the maintenance system 8 may determine that the second user's test is complete and may hand back control to the first user. Alternatively, if the first user is an ultimate user, the first user may assign the task back to themselves. In this manner, the ultimate user may take control of the maintenance test from the second user.

With the flap check test portion of the maintenance routine complete, the alignment of the port elevator may now take place. It is again contemplated that the second user may move to the next location, as indicated at 222, to support the port elevator test although this need not be the case as an alternate user or alternate communication terminal 40 may be utilized. At some point in the test, the test prompts the first user to inspect the elevator state. At this point, the first user or the maintenance system 8 assigns the test to the second user as indicated at 208. The second user may complete the test and the maintenance system 8 may determine that the maintenance routine is completed and may display a maintenance routine completion on the control terminal. While the above description limits the example to a first user and a second user it will be understood that any number of users may be utilized and that any number of communication terminals 40 may be used. Further, while the above description limits the test related to the alignment of the port elevator to after the flap check test it is contemplated that the two maintenance tests may be executed simultaneously.

It will be understood that the method of implementing a maintenance schedule for an aircraft is flexible and the method illustrated is merely for illustrative purposes. For example, the sequence of steps depicted is for illustrative purposes only, and is not meant to limit the method 100 in any way, as it is understood that the steps may proceed in a different logical order or additional or intervening steps may be included without detracting from embodiments of the invention. For example, the method 100 may include determining where the multiple communication terminals 40 are located. In such an instance, the maintenance test may be assigned at 106 to the communications terminal 40 closest to the corresponding component 20. Further still, the assigning the maintenance test, at 106, may be in response to a user input and the method 100 may include receiving a user input and/or determining that a user input has been received. Further still, the method may include determining whether a maintenance test is available for a user at one of the multiple communication terminals 40. This may include that the controller 26 may determine whether a user is logged into the communication terminal 40 and/or whether the user logged into the communication terminal has permission to access the maintenance test.

Figure 4:
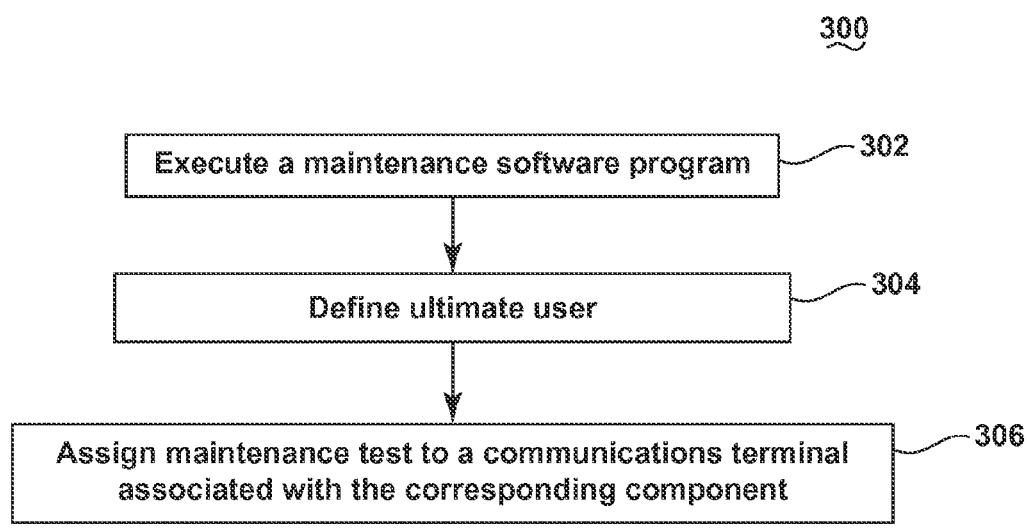
FIG. 4 is a flowchart showing a method for management of a maintenance routine for an aircraft according to another embodiment of the invention.

In accordance with another embodiment of the invention, FIG. 4 illustrates a method 300, which may be used for management of a maintenance routine for an aircraft, such as the aircraft 10, with a maintenance system comprising multiple communication terminals located physically about the aircraft and in data communication with each other, such as the maintenance system 8. The method 300 is similar to the method 100 previously described. It will be understood that the description of the like parts of the method 100 applies to the method 300, unless otherwise noted. Similarities include that at 302 the maintenance system 8 may execute a maintenance software program for a maintenance routine comprising maintenance tests corresponding to components 20 of the aircraft 10 and that a maintenance test may be assigned to a communications terminal associated with a corresponding component to define an associated terminal for controlling the execution of the maintenance test by displaying a maintenance test indication on the associated terminal as indicated at 306.

At 304, the maintenance system 8 may define an ultimate user. The ultimate user may be defined in any suitable manner including that the ultimate user may be defined based on a predetermined hierarchy of multiple users, based on one of the location of the user or the identity of the user, etc. For example, the maintenance system 8 may define a pilot as the ultimate user based on the pilot's location in the cockpit or based on a unique ID for the pilot.

In the method of management 300, the ultimate user may override the assignment of the maintenance test as assigned at 306 or may end the maintenance routine before completion of the maintenance test as assigned at 306. Overriding the assignment may include allowing the ultimate user to control a maintenance test being executed by a different user, allowing the ultimate user to oversee a maintenance test being executed by a different user, allowing the ultimate user to modify a maintenance test being executed by a different user, allowing the ultimate user to end access to the associated terminal for a different user, etc. For example, if the ultimate user is a pilot and the pilot wishes to fly the aircraft without waiting for the completion of the maintenance routine the pilot may mark the maintenance task complete, finish the maintenance task himself, or simply end the maintenance routine.

It will be understood that the method for management of a maintenance routine for an aircraft is flexible and the method illustrated is merely for illustrative purposes. For example, the sequence of steps depicted is for illustrative purposes only, and is not meant to limit the method 300 in any way, as it is understood that the steps may proceed in a different logical order or additional or intervening steps may be included without detracting from embodiments of the invention. Further, it is contemplated that the assigning of the maintenance test may also utilize the predetermined hierarchy of multiple users in determining which user or communication terminal to make the assignment to. Further, the method 300 may also include displaying the maintenance routine on a communication terminal being utilized by the ultimate user including displaying any completion indications of maintenance tasks or the maintenance routine.

Aircraft maintenance may require many steps. In order to complete a maintenance routine it may be necessary to distribute various maintenance tasks among many resources. Technical effects of the above-described embodiments include that portions of a maintenance routine may be assigned and controlled by a maintenance system. Including that portions of the maintenance routine may be transferred between the aircraft and communication terminal(s) that are external of the aircraft. The above-described embodiments provide for management of the maintenance tasks between multiple users and/or multiple terminals. The above-described embodiments allow for many maintainers to coordinate efforts across multiple users based upon permissions of that user and/or the user's location and may allow for an assignment of the immediate session to be resumed at a different terminal. This allows maintenance routines to be completed more efficiently and minimizes the time aircraft are grounded. The above-described embodiments may also allow for a reduced maintenance force than typically required to perform complicated multi-location on the same vehicle maintenance tasks. Further, the above-described embodiments allow a centrally located maintainer to coordinate maintenance tasks between multiple maintainers similarly located or dispersed to different areas of the aircraft.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for management of a maintenance routine for an aircraft with a maintenance system comprising multiple communication terminals located physically about the aircraft and in data communication with each other, the method comprising:
    executing, by the maintenance system, a maintenance software program for the maintenance routine comprising maintenance tests corresponding to components of the aircraft;
    defining, by the maintenance system, an ultimate user; and
    assigning a maintenance test to a communications terminal associated with a corresponding component to define an associated terminal for controlling the execution of the maintenance test by displaying a maintenance test indication on the associated terminal;
    wherein the ultimate user may override the assignment of the maintenance test, including allowing the ultimate user to control a maintenance test being executed by a different user, or may end the maintenance routine before completion of the maintenance test.

2. The method of claim 1 wherein the ultimate user is defined based on a predetermined hierarchy of multiple users.

3. The method of claim 2 wherein the assigning the maintenance test further comprises utilizing the predetermined hierarchy of multiple users.

4. The method of claim 1 wherein the ultimate user is defined based on one of a location of the user or an identity of the user.

5. The method of claim 1, further comprising displaying, by the maintenance system, the maintenance routine on a communication terminal being utilized by the ultimate user.

6. The method of claim 1 wherein the maintenance system defines a pilot as the ultimate user.

7. A maintenance system, comprising:
    multiple communication terminals located physically about an aircraft and in data communication with each other and providing access to a maintenance routine such that the maintenance routine may be completed by at least one user via at least one of the multiple communication terminals and where the multiple communication terminals are configured to support a number of independent, non-interactive maintenance tests; and
    at least one controller configured to execute a maintenance software program for the maintenance routine comprising maintenance tests corresponding to components of the aircraft, define an ultimate user, and assign a maintenance test to a communications terminal associated with a corresponding component to define an associated terminal for controlling the execution of the maintenance test by displaying a maintenance test indication on the associated terminal and where the ultimate user may override the assignment of the maintenance test, including allowing the ultimate user to end access to the associated terminal for a different user, or may end the maintenance routine before completion of the maintenance test.

8. The maintenance system of claim 7 wherein the controller is configured to allow multiple users to access the maintenance routine.

9. The maintenance system of claim 7 wherein the multiple communication terminals are configured to accept user inputs.

10. The maintenance system of claim 9 wherein the ultimate user is defined by the controller based on a user input.

* * * * *